(12) United States Patent
Okamoto

(10) Patent No.: US 6,335,913 B1
(45) Date of Patent: Jan. 1, 2002

(54) DISK MEMORY DEVICE AND DISK READ-OUT SIGNAL PROCESSOR

(75) Inventor: Yutaka Okamoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/272,609

(22) Filed: Mar. 19, 1999

(30) Foreign Application Priority Data

Mar. 20, 1998 (JP) .......................................... 10-071688

(51) Int. Cl.[7] .............................................. G11B 7/00
(52) U.S. Cl. ................................ 369/59.22; 365/59.23
(58) Field of Search .......................... 369/44.27, 44.37, 369/59, 54, 124; 706/15

(56) References Cited

U.S. PATENT DOCUMENTS

| | | | | |
|---|---|---|---|---|
| 5,068,801 A | * | 11/1991 | Clark | 369/54 |
| 5,295,130 A | * | 3/1994 | Tobita et al. | 369/124 |
| 5,311,182 A | | 5/1994 | Weaver | 341/155 |
| 5,555,231 A | * | 9/1996 | Yamamoto | 369/54 |
| 5,594,597 A | | 1/1997 | Padden | 360/46 |
| 5,642,341 A | * | 6/1997 | Strok | 369/44.37 |
| 5,699,487 A | | 12/1997 | Richardson | 395/22 |
| 5,943,660 A | * | 8/1999 | Yesildirek et al. | 706/15 |
| 5,950,181 A | * | 9/1999 | Federal | 706/15 |
| 6,055,524 A | * | 4/2000 | Cheng | 706/15 |
| 6,067,536 A | * | 5/2000 | Maruyama et al. | 706/15 |

FOREIGN PATENT DOCUMENTS

| | | |
|---|---|---|
| JP | 5-62365 | 3/1993 |
| JP | 9-120642 | 5/1997 |

OTHER PUBLICATIONS

IEEE Transactions on Magnetics. vol. 31, No. 6, Nov. 1995 Simplified Nonlinear Equalizers S.K. Nair et al, pp. 3051–353.

* cited by examiner

Primary Examiner—Nabil Hindi
(74) Attorney, Agent, or Firm—Pillsbury Winthrop LLP

(57) ABSTRACT

A disk memory device comprises a head which reads a read-out signal from a disk, an amplifier which amplifies an analog signal waveform of the read-out signal read from the head, a filter which decreases a noise of the read-out signal output from the amplifier, an A/D converter which converts the read-out signal of which noise is decreased by the filter into a digital signal including a waveform distortion component, and a neural network type signal processing circuit which detects a binarized data from the digital signal.

11 Claims, 4 Drawing Sheets

DISK MEMORY DEVICE AND DISK READ-OUT SIGNAL PROCESSOR

BACKGROUND OF THE INVENTION

The present invention relates to a disk memory device which records and reproduces an optical, a magnetic or an optical-magnetic data by using a disk as a record medium, especially, to a signal processing device used to a data reproduction operation.

Conventionally, a disk memory device which optically, magnetically or optical-magnetically records and reproduces data on a disk (storage medium) has a read-out signal processing circuit to reproduce (decode) data (data recorded on the disk) from the read-out signal (read signal) read from the disk with a read head (including a read/write composite head). In the disk memory device, there are a magnetic disk drive which is called hard disk drive (HDD), an optical disk drive, and a magnetic-optical disk drive, specifically. The read-out signal processing circuit is often constructed specifically by an exclusive IC which integrally includes record and reproduction function as a read/write circuit.

The read-out signal processing circuit roughly comprises an amplifier which amplifies the read-out signal read from the head, a waveform equalizer to waveform-equalize the read-out signal waveform, a data detection circuit to perform a data detection processing (identification processing of binarization), and a decoder (decoding circuit) to decode to the record data.

The waveform equalizer is produced to correct the waveform distortion caused by the result of passing a record channel (system which consists of the record medium/the head) and make the detection error rate in the data detection processing within the permissive range when data is recorded on the disk. Conventionally, a linear equalization method of modeling the record channel to the linear system and correcting linear distortion of the read-out signal is adopted. Specifically, an adaptive digital filter to adaptively follow to the characteristic change of the record channel is often adopted.

Recently, the signal processing technology of the PRML (Partial Response Maximum Likelihood) method is being adopted as a data detection circuit. This PRML method is a method to sequentially detect data by using the correlation before and behind the read-out signal waveform, and, specifically, the Viterbi decoder is used.

In recent years, for example, a high record density like several Gbits/in$^2$ has been achieved in HDD to make the memory capacity of the disk memory device mass. In such a high record density, since it is impossible to set a linear model to the binary data recorded on the disk in a response characteristics of the conventional record channel, it is necessary to consider a nonlinear element. Here, when the ratio of a nonlinear distortion becomes large, the equalization residual error increases in the linear equalization circuit, and securing the detection error rate within the permissive range becomes difficult in the data detection processing.

The waveform equalizer, which uses a hierarchical network or multilayer perceptron type neural network scheme (Hereafter, so called as a MLP type) is proposed as a method to equalize a nonlinear distortion of the read-out signal waveform. In the conventional read-out signal processing circuit, as for the read-out signal to which a nonlinear waveform distortion is removed by the MLP type waveform equalizer, the data detection processing is executed with the conventional data detection circuit.

As mentioned above, with a high recording density in the disk memory device, a nonlinear distortion component which is occupied to the distortion element included in the read-out signal waveform when data is reproduced from the disk, increases up to the extent which cannot be disregarded. Therefore, the necessity of the nonlinear waveform equalization processing to remove a nonlinear distortion component becomes large. It is known that it is effective to an equalization processing of a nonlinear distortion component in the waveform equalizer which uses the MLP type signal processing circuit.

By the way, a learning process of determining the weighting coefficient of the network is necessary for the equalization circuit of the neural network scheme. In this learning process, a calculation method called as a backpropagation algorithm is used. This method corrects a difference between an actual value on the output edge and the ideal value which is the equalization target according to the degree of contribution to the output (that is, a ratio which influences to the output) according to the weighting coefficient of the network. Since largeness of the equalization error of the output of the equalization circuit is directly related to the detection error rate in the data detection method to detect the data for each bit, the learning method by the backpropagation algorithm is reasonable.

However, it becomes difficult to control the detection error rate in the data detection method to detect the data for each bit in which the interference between adjacent bits of the read-out signal waveform is impermissible with a request of a high record density in recent years. In the signal processing method as above-mentioned PRML method, the amount of mutual interference between adjacent bits of the read-out signal waveform is permitted in some degree, and data detection processing is performed with following the state of the change of the waveform value by interference with the sequence. That is, in the signal processing method of the PRML method, since the power of the signal to extend between adjacent bits can be used valid by the permission of mutual interference of the read-out signal waveform, it becomes possible to lower the detection error rate to the read-out signal of same signal-to-noise ratio (S/N). In this case, it is general that the maximum likelihood sequence detector (ML decoder or Viterbi decoder) is designed on an assumption of the linear waveform interference to avoid the complication of the circuit. Therefore, the equalization circuit of the neural network scheme to assume the read-out signal waveform only of linear waveform interference according to the class of the PRML method to be a learning target is theoretically valid.

However, it is not practical to use the equalization circuit, which adjusts the equalization error with the learning target to 0, in the cost, when the neural network scheme is actually applied to the circuit. In addition, it is difficult to completely remove the influence of an individual device and a change with the lapse of time. Therefore, the following problems are occurred in this case, when the circuit design to which some equalization error is remained is performed. The lowest point of the detection error rate and the residual equalization error becomes a disagreement with the lowest point of the residual equalization error in the evaluation value at the learning process, when the ML decoder which does not consider the equalization error and the equalization circuits of the neural network scheme (MLP type equalization circuit) are combined. This reason is why the residual equalization error of the equalization circuit is becoming of colored noise with the correlation, but the ML decoder has a maximum performance when the deviation of ideal value is an additive white Gauss noise.

In other words, the equalization circuit of the neural network scheme using the learning method, to which the residual equalization error in the output is minimized, does not always operate as the error rate becomes lowest. It is ideal to perform the learning of the equalization circuit of the neural network scheme executed by using the output of an ML detector, when the read-out signal is equalized by the equalization circuit and the circuit to detect data with the ML detector (Viterbi decoder) is constructed. However, since the output of the ML detector is a result which includes the ML sequence detection operation, it is not practical to use the evaluation value to the learning process of the equalization circuit of the neural network scheme because of a lot of problems.

BRIEF SUMMARY OF THE INVENTION

An object of the present invention is to provide a disk memory device of effectively lowering a data error rate and high capacity and high reliability, by learning a feature of an input signal string by using the signal processing circuit of the neural network scheme of the MLP type etc., and outputting the same value as the output when the conventional data detector is used together.

A disk memory device (optical disk drive) according to the present invention comprises: a head (an optical pickup) which reads a read-out signal from a disk; an amplifier which amplifies an analog signal waveform of the read-out signal read from the:head; a filter which decreases a noise of the read-out signal output from the amplifier; an A/D converter which converts the read-out signal of which noise is decreased by the filter into a digital signal including a waveform distortion component; and a neural network type signal processing circuit which detects a binarized data from the digital signal.

A first signal processing device of a disk read-out signal comprises a neural network type signal processing circuit which detects a binarized data from the digital signal including a waveform distortion component, and which comprises an input layer which has a plurality of delay elements which have a delay time of a data clock cycle and are connected in series, a hidden layer which has a plurality of nodes without a connection relationship mutually, and an output layer which has one output node, and wherein each of signals on each end of the delay elements which construct the input layer is multiplied by a coupling weighting value and a result thereof is input to each node in the hidden layer, each of the plurality of nodes included in the hidden layer outputs a value of a nonlinear function for a sum total of an input, the output node inputs a value by which a coupling weighting value is multiplied to an output of each of the plurality of nodes included in the hidden layer, respectively, and outputs an output value of a nonlinear function to an input sum total of the output node.

A second signal processing device of a disk read-out signal comprises a neural network type signal processing circuit which detects a binarized data from the digital signal including a waveform distortion component, and which comprises an input signal sampling layer in which an input signal waveform is sampled, a pattern recognition layer constructed with pattern recognition nodes which multiply an amplitude value of the sampled input signal waveform by a weighting coefficient obtained by a learning process, and an output value judgment node which multiplies an output value from each pattern recognition node in the pattern recognition layer by the weighting coefficient obtained by the learning process, judges "0" data or "1" data based on this each multiplication result, detects binarized data from the second read-out signal.

The preferred manner of the present invention is as follows.

(1) The neural network type signal processing circuit includes a multilayer perceptron type neural network.

(2) The neural network type signal processing circuit comprises an input layer which has a plurality of delay elements which have a delay time of a data clock cycle and are connected in series, a hidden layer which has a plurality of nodes without a connection relationship mutually, and an output layer which has one output node, each of signals on each end of the delay elements which construct the input layer is multiplied by a coupling weighting value and a result thereof is input to each node in the hidden layer, each of the plurality of nodes included in the hidden layer outputs a value of a nonlinear function for a sum total of an input, the output node inputs a value by which a coupling weighting value is multiplied to an output of each of the plurality of nodes included in the hidden layer, respectively, and outputs an output value of a nonlinear function to an input sum total of the output node.

(3) The nonlinear function is a sigmoid function.

(4) The signal processing circuit comprises an input signal sampling layer in which an input signal waveform is sampled, a pattern recognition layer constructed with pattern recognition nodes which multiply an amplitude value of the sampled input signal waveform by a weighting coefficient obtained by a learning process, and an output value judgment node which multiplies an output value from each pattern recognition node in the pattern recognition layer by the weighting coefficient obtained by the learning process, judges "0" data or "1" data based on this each multiplication result, detects binarized data from the second read-out signal.

For example, after performing the waveform equalization processing by the waveform equalizer, the conventional signal processing system detects data from the read-out signal with the data detection circuit such as the Viterbi decoder. In contrast to this, the present invention adopts the signal processing system which inputs the read-out signal to which the noise is removed with, for example, the low-pass filter to the MLP type signal processing circuit, directly detects the binary data (binarized data) from the corresponding read-out signal, and outputs it. In other words, the signal processing system according to the present invention studies the signal pattern which removes neither the waveform distortion component included in the read-out signal conventionally nor the noise component but includes them, and determines the weighting coefficient obtained from this learning process. And, the signal processing circuit which extracts the feature of the signal pattern by the weighting coefficient and detects binarized data corresponding to this feature.

Therefore, with the signal processing circuit of such a configuration, since the process by which the read-out signal which includes a nonlinear distortion is converted into a suitable waveform for a linear signal processing system once can be excluded, data can be detected from the read-out signal which includes a nonlinear component by an enough low detection error rate by improving the effect of learning in the neural network scheme.

According to the present invention, in the disk memory device such as, for example, an optical disk drive, since the presence of the data error can be directly studied for the read-out signal which has the nonlinear distortion component by including the data detection function to the signal processing circuit of the neural network scheme of the MLP type etc., it becomes possible to effectively lower the influence of the nonlinear distortion component. Therefore, it becomes possible to remove the influence of the nonlinear distortion component by developing the waveform equalization function of the neural network scheme to minimize the residual equalization error enough, to effectively lower the data detection error rate with this, and to provide the disk memory device of high capacity and high reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
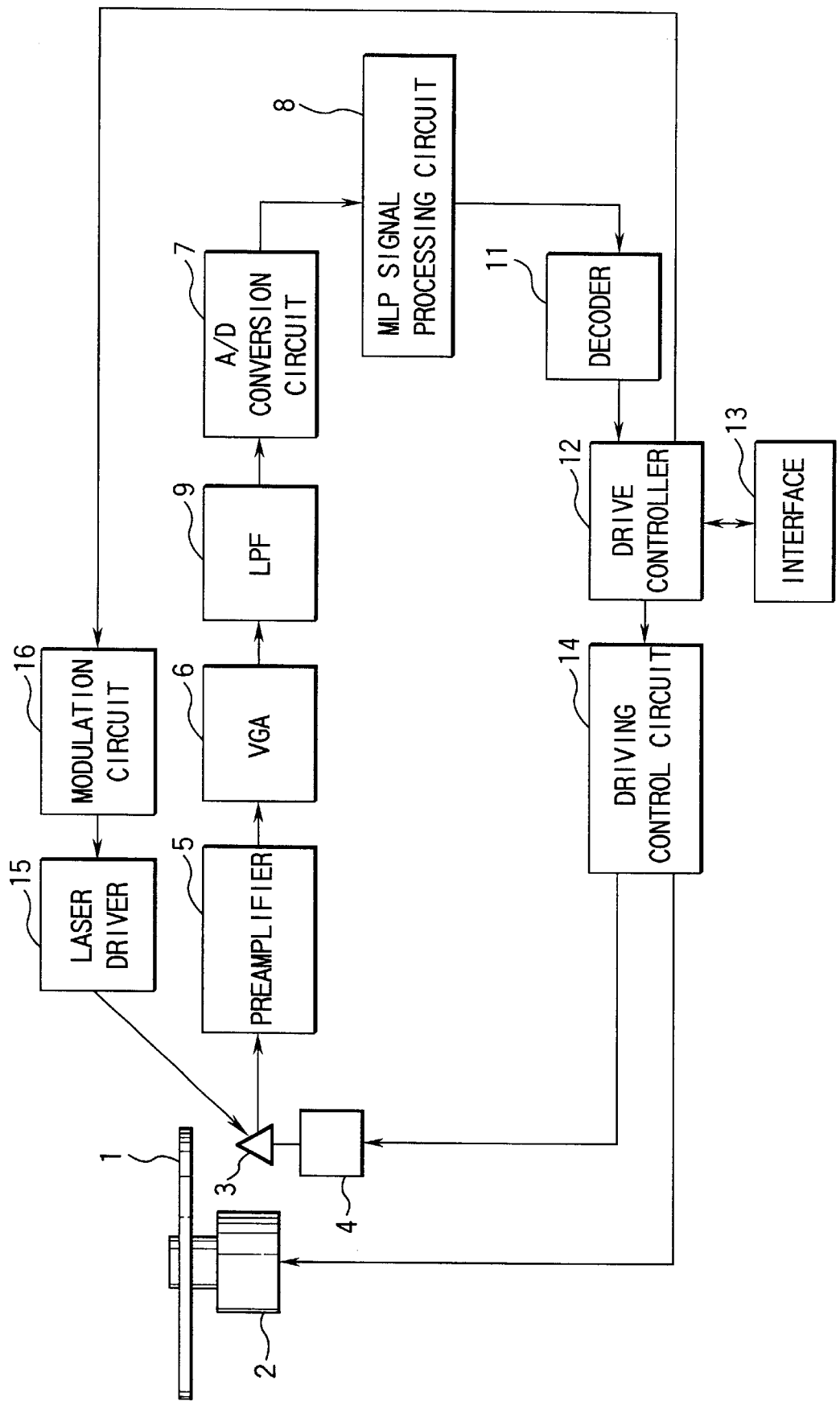
FIG. 1 is a block diagram which shows a main part of an optical disk drive relating to the embodiment of the present invention.

Hereafter, an embodiment of the present invention referring to the drawing will be explained.

Figure 2:
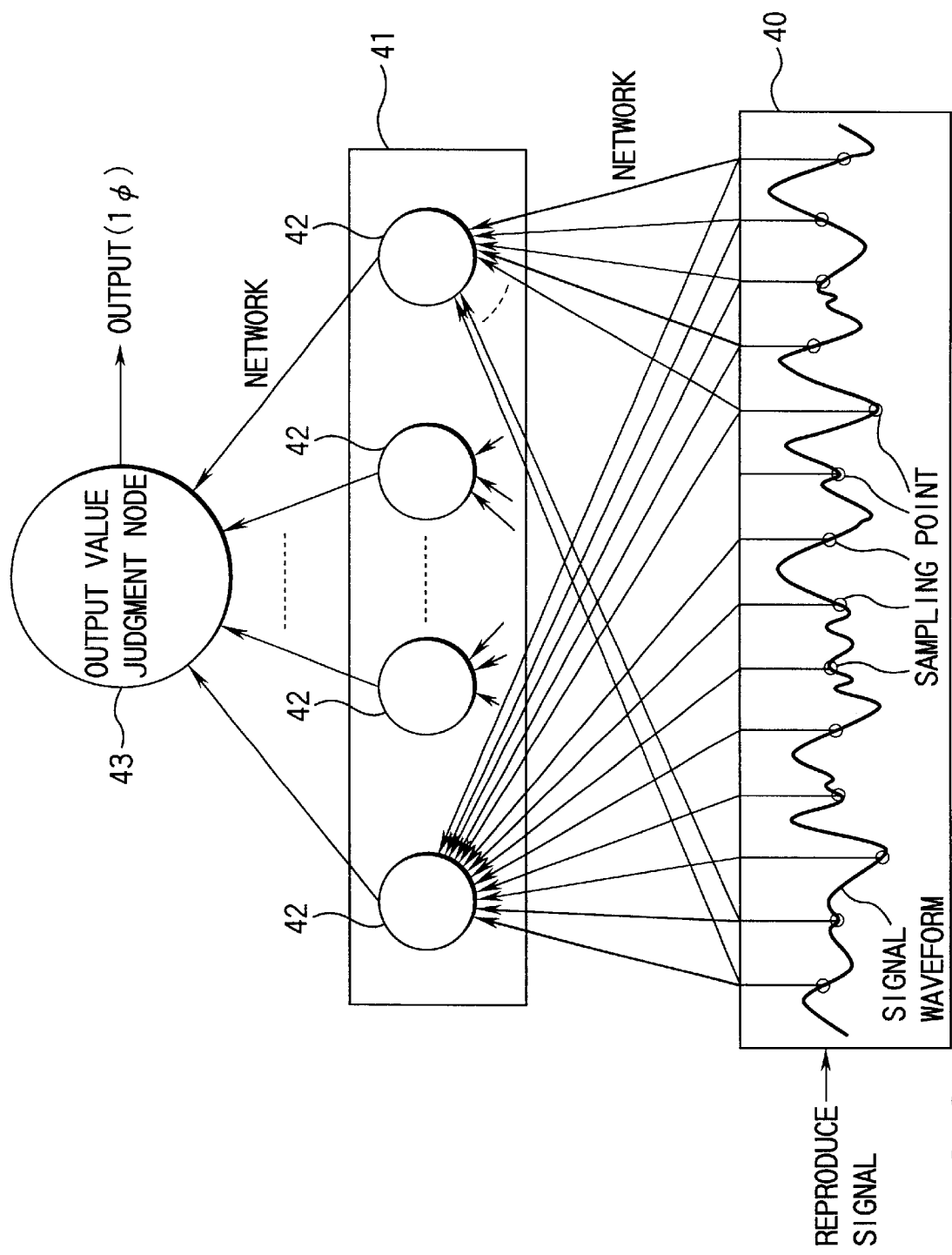
FIG. 2 is a figure which shows a concept of the signal processing circuit of the neural network type configuration relating to this embodiment.
Figure 3:
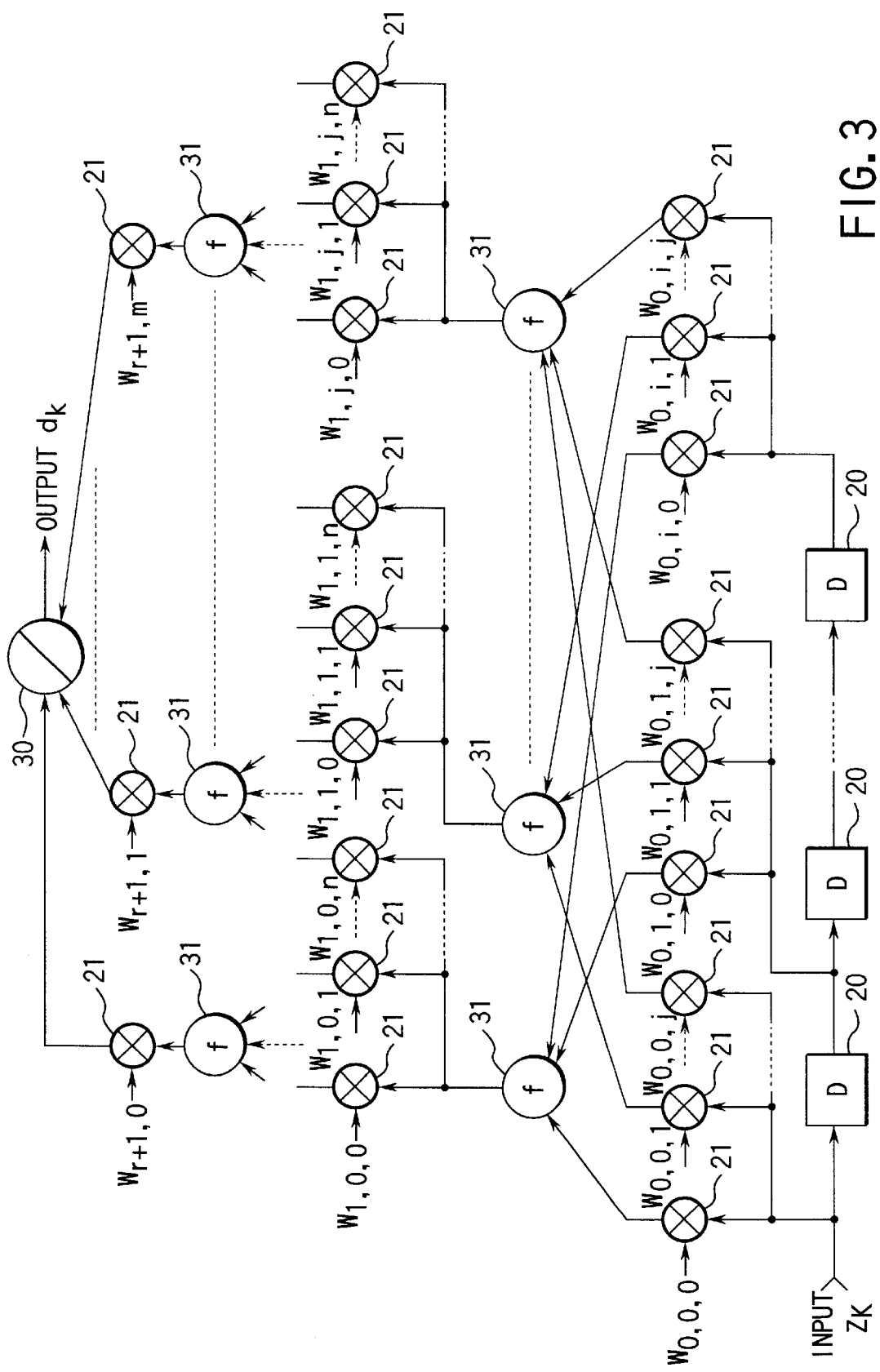
FIG. 3 is a block diagram which shows a configuration of the signal processing circuit of the MLP type configuration relating to this embodiment.

FIG. 1 is a block diagram which shows a main part of the optical disk drive relating to this embodiment, FIG. 2 is a conceptual chart of the signal processing circuit of the neural network type configuration relating to this embodiment, and FIG. 3 is a block diagram which shows the configuration of the signal processing circuit of the MLP type configuration relating to this embodiment.

(Configuration of Device)

In this embodiment, it assumes and will be explained to apply to the optical disk drive of the record and reproduction type as a disk memory device. As shown in FIG. 1, the optical disk drive has a rewritable optical disk 1 which is the record medium, an optical pickup 3, a data reproduction system and a data record system which describes later in detail, a drive controller 12, and an interface 13. The optical disk 1 is rotated and driven by the spindle motor 2. The optical pickup 3 is moved and adjusted by the servo motor 4 to irradiate the laser light to the optical disk 1 by the drive with the laser driver 15, and records and reproduces an information in optics. The spindle motor 2 and the servo motor 4 are driven and controlled through the driving control circuit 14 by the drive controller 12.

The data record system has a laser driver 15 and a modulation circuit 16. The modulation circuit 16 executes the encoding processing by which the record data sent from the drive controller 12 is converted into the predetermined bit stream. The laser driver 15 drives the optical pickup 3 so as to record the mark according to the bit stream output from the modulation circuit 16 on the disk 1.

The data reproduction system has a preamplifier 5, a variable gain amplifier (VGA) 6, an A/D converter 7, a signal processing circuit 8 of the neural network type configuration, a low-pass filter (LPF) 9, and a decoder 11. The preamplifier 5 and the VGA 6 amplify the read-out signal read by the optical pickup 3. The LPF 9 is a filter circuit to remove a noise out of range of the signal band from the read-out signal waveform. The A/D converter 7 converts an amplified read-out signal into a digital signal which is the quantization sample value at the discrete time.

The signal processing circuit 8 of the neural network type configuration is a circuit which has the data detection function to detect binarized data from the read-out signal which includes the nonlinear distortion component, and a digital signal processing circuit of the multilayer perceptron type (hereinafter, called as a MLP type signal processing circuit) as shown in FIG. 3. The decoder 11 restores the bit stream detected with the MLP type signal processing circuit 8 to an original data (record data).

The drive controller 12 is a main controller of the device, is connected with, for instance, the personal computer through the interface 13, and controls data transfer. A moving images compression circuit necessary for the record and reproduction operation of image information, a moving images extension circuit, and an error detection correction circuit which performs an error detection correction processing of the data demodulated by demodulating circuit 10 are also included in the device (not shown).

(Configuration of MLP type signal processing circuit 8)

The MLP type signal processing circuit 8 according to this embodiment, which differs from the conventional data detection circuit (ML detection circuit such as the Viterbi decoders), is a digital signal processing circuit which extracts a feature of the signal pattern from the read-out signal including the waveform distortion component and the noise component, and includes the data detection function to detect binarized data (1/0) corresponding to this feature. That is, the conventional data detection circuit removes the noise of a distortion component of the record channel and an unnecessary frequency components with the waveform equalizer, and detects binarized data from the read-out signal in almost ideal condition by this waveform equalizer. On the other hand, the MLP type signal processing circuit 8 according to this embodiment executes learning by which the coupling weighting coefficient of the network is determined from the signal pattern of the read-out signal which includes the waveform distortion component and the noise component, and executes processing to which the feature of the signal pattern is extracted by this determined weighting coefficient. In other words, binarized data is directly detected from the read-out signal which includes the waveform distortion component and the noise component in the present invention.

Hereinafter, a conceptual configuration of the MLP type signal processing circuit 8 according to this embodiment will be explained referring to FIG. 2.

A conceptual configuration of this signal processing circuit 8 roughly consists of an input signal sampling layer 40, a pattern recognition layer 41, and an output value judgment node 43. The input signal sampling layer 40 samples an input signal waveform (read-out signal) by the channel bit rate (data transfer rate after modulating) (a sampling point is a point shown in FIG. 2). An amplitude value of the input signal waveform sampled through the network is input to a plurality of pattern recognition nodes 42 by the pattern recognition layer 41.

Each pattern recognition node 42 multiplies each of these input values by the weighting coefficient obtained by learning, and outputs the result of applying a nonlinear function to these multiplication results to the output value judgment node 43. That is, each pattern recognition node 42 outputs a large positive value when a certain signal pattern is recognized and outputs a large negative value when a different signal pattern is recognized, according to the waveform of the input signal waveform (amplitude value at the sampling point). The output values according to the signal pattern are different:according to each pattern recognition node 42.

Therefore, each pattern recognition node 42 shows the degree of the feature of the input signal waveform. In other words, the whole output value patterns of the pattern recognition layer 41 corresponds to the signal pattern to which the feature of the input signal waveform is abstracted.

The output value judgment node 43 multiplies the output value from each pattern recognition node 42 by the weighting coefficient obtained by learning. An affirmative value, in which the output value of a certain pattern recognition node 42 judges that the data is "1" data is indicated, but a negative value is indicated on other nodes 42. Therefore, the output value judgment node executes overall binary judgment processing based on the output from each pattern recognition node 42. Specifically, the output value judgment node 43 detects binarized data from the read-out signal to which the distortion is occurred by the channel characteristic and the noise, by obtaining the sum total of the output value from each pattern recognition node 42, performing judgement and processing with a certain threshold after applying a nonlinear function, and outputting "0" or "1".

Next, a specific configuration and an operation of the signal processing circuit 8 according to this embodiment will be explained referring to FIG. 3.

The MLP type signal processing circuit 8 has a plurality of delay circuits 20 connected in series, a multiplier 21, a hidden node 31, and an output node 30 as shown in FIG. 3. An input signal sample value Zk is delayed by the delay circuit 20 which has a delay amount of the data sampling clock time, and is output to the delay circuit 20 of the next steps. Here, an output signal sample value $Z_{k-j}$ of a j-th delay circuits 20 at time k is multiplied by a coupling weighting value $W_{0,i,j}$ with the multiplier 21, and becomes an input of (j+1)th hidden node 31. The input signal sample value $Z_k$ is multiplied by a coupling weighting value $W_{0,0,0}$ by the multiplier 21, and, for example, becomes one of the input of the first hidden node in an intermediate layer of most input signal side.

Similarly, an output $Z_{k-i}$ of the i-th delay circuit is multiplied by a coupling weighting value $W_{0,i,j}$, and becomes one of the input of (j+1)th hidden node in an intermediate layer of most input signal side. An output $H_{0,j,k}$ of (j+1)th hidden node in an intermediate layer of most input signal side becomes a value to which the sum total of the inputs is evaluated by the sigmoid function f. That is, the next formula is given.

$$H_{0,j,k}=f(\Sigma W_{0,i,j} \cdot Z_{k-i}) \quad (1)$$

$$f(x)=(1-\exp(x))/(1+\exp(-x)) \quad (2).$$

An output $H_{0,j-1}$ of j-th hidden node of an intermediate layer of most input signal side is multiplied by a coupling weighting value $W_{1,j,m}$ by the multiplier 21 as well as the formula (1), and becomes one of the input of (m+1)th hidden node in an intermediate layer of one stage output side. Moreover, an output of a hidden node from an intermediate layer of most input signal side to an intermediate layer of one stage output side also becomes a value to which the sum total of the input is evaluated by the sigmoid function f as well as the formula (1).

In the same way, the connection of an intermediate interlayer is stacked in the same pattern, the coupling weighting value is multiplied by the output of the hidden node in an intermediate layer of most output side, and it becomes one of the input of the output node 30. An output of the output node 30, that is, an output value $d_k$ of the MLP type signal processing circuit 8 at time k, becomes an input sum total of the output node 30. Therefore, this output $d_k$ is as follows.

$$d_k=\Sigma_m W_{r+1,m,0} \cdot f(\Sigma_n W_{r,n,m} \cdot f(\Sigma_p W_{r-1,p,n} \cdot f(\Sigma_q W_{0,q,i} \cdot Z_{k-q}) \ldots ) \ldots ) \quad (3)$$

A coupling weighting value is obtained by repeating the learning procedure according to the following backpropagation algorithms.

Specifically, it is as follows. First, a small random value is set in all coupling weighting value as an initial value. Moreover, an output of (v+1)th hidden node in (u+l)th intermediate layer from the input side is assumed to indicate as follows. Here, G indicates one lower layer, and is a sum total of the value to multiply a weighting coefficient W by output O of u-th intermediate layers.

$$O_{u,v,k}=f(G_{u,v,k}) \quad (4)$$

$$G_{u,v,k}=\Sigma_i W_{u-1,i,v} O_{u-1,i,k} \quad (5)$$

An error $\delta_{x,k}$ in the output of the output node when the number of intermediate layers is X is shown as follows when the ideal output expected when k-th learning waveform series is input is assumed to be Ck.

$$\delta_{x,k}=2(d_k-C_k)f'(G_{x,k}) \quad (6).$$

Here, f' is derivative of f.

An error $\delta_{r,m,k}$ in (m+1)th hidden node of (r+1)th intermediate layer from the input side of most output side is obtained by the following formula by back-propagation.

$$\delta_{r,m,k}=(\Sigma_p W_{r+1,m,p} \delta_{r+1,p,k})f'(G_{r,k}) \quad (7)$$

A value $W_{r,i,j}(k)$ of the all coupling weighting when k-th learning waveform series is input is updated as follows.

$$\delta_{Wr,i,j}(k+1)=\beta_k \cdot \delta_{r-1,i,k} O_{r-1,i} \quad (8)$$

$$W_{r,i,j}(k+1)=W_{r,i,j}(k)+\delta_{Wr,i,j}(k)+\eta W_{r,i,j}(k-1) \quad (9)$$

Here, $\beta_k$ is a learning coefficient, and $\eta$ is an inertia coefficient.

Hereinafter, a procedure by which the coupling weighting value of the MLP type signal processing circuits 8 is determined will be explained specifically.

Figure 4:
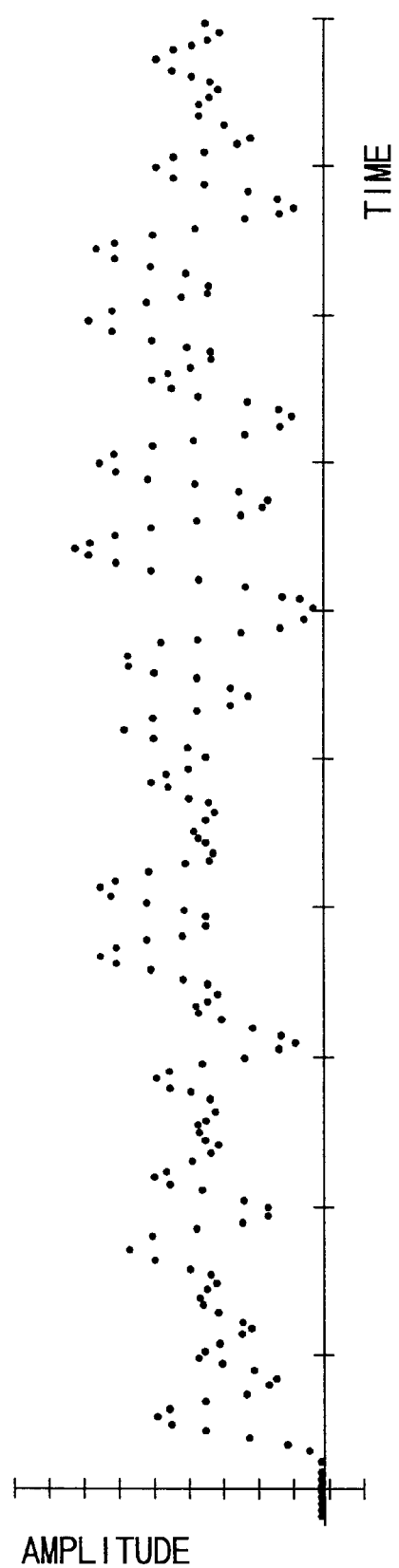
FIG. 4 is a signal waveform chart to explain the waveform equalization processing relating to this embodiment.

FIG. 4 is a signal waveform when the read-out signal from the disk 1 which includes a nonlinear distortion component is amplified and thereafter converted into a digital with the A/D converter 7. A sampling clock is supplied by a clock recovery circuit which synchronizes the frequency and the phase with the read-out signal by using a PLL circuit (not shown).

In the MLP type signal processing circuit 8, to determine a coupling weighting value by learning, the formulas (6) to (9) are recurrently calculated by inputting the waveform sample value series shown in FIG. 4 as the $Z_k$, and using each of binary data $C_k$ to be detected from an output $d_k$ obtained at this time and a waveform of FIG. 4. This operation is repeated until the value of the error on the output end becomes sufficiently small.

At a usual reproduction, binarized data is detected and output from the read-out signal waveform which has the distortion characteristic shown in FIG. 4 by using the weighting value determined when learning.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk memory device comprising:

a head which reads a readout signal from a disk;

an amplifier which amplifies an analog signal waveform of the read-out signal read from said head;

a filter which decreases a noise of the read-out signal output from said amplifier;

an A/D converter which converts the read-out signal of which noise is decreased by said filter into a digital signal including a waveform distortion component; and a neural network type signal processing circuit which detects a binarized data from the digital signal, said neural network type signal processing circuit comprising an input layer, at least two hidden layers and an output layer and including a waveform equalizing function and a detecting function of the binarized data.

2. The disk memory device according to claim 1, wherein said input layer has a plurality of delay elements which have a delay time of a data clock cycle and are connected in series, each of said at least two hidden layers has a plurality of nodes without a connection relationship mutually, the output layer has one output node, each of signals on each end of the delay elements constructing said input layer is multiplied by a coupling weighting value and a result thereof is input to each node in a first hidden layer of said at least two hidden layers, each of said plurality of nodes in said at least two hidden layers outputs a value of a nonlinear function for a sum total of an input, and said output node inputs a value by which a coupling weighting value is multiplied to an output of each of said plurality of nodes in said at least two hidden layers, respectively, and outputs an output value of a nonlinear function for an input sum total of said output node.

3. The disk memory device according to claim 2, wherein said nonlinear function is a sigmoid function.

4. The disk memory device according to claim 1, wherein said input layer samples an input signal waveform, each of said hidden layers has a plurality of pattern recognition nodes to multiply an amplitude value of said sampled input signal waveform by a weighting coefficient obtained by a learning process, and said output layer has an output value judgment node to multiply an output value from each pattern recognition node in said at least two hidden layers by the weighting coefficient obtained by the learning process, judge "0" data or "1" data based on this each multiplication result, and output a result thereof.

5. A signal processing device of a disk read-out signal comprising a neural network type signal processing circuit to detect a binarized data from the digital signal including a waveform distortion component which comprises an input layer including a plurality of delay elements having a delay time of a data clock cycle and connected in series, at least two hidden layers including a plurality of nodes without a connection relationship mutually, and an output layer including one output node, wherein each of signals on each end of the delay elements which construct said input layer is multiplied by a coupling weighting value and a result thereof is input to each node in said hidden layer, each of said plurality of nodes included in said hidden layers outputs a value of a nonlinear function for a sum total of an input, and said output node inputs a value by which a coupling weighting value is multiplied to an output of each of said plurality of nodes included in said hidden layer, respectively, and outputs an output value of a nonlinear function to an input sum total of said output node, wherein said neural network type signal processing circuit includes waveform equalizing function and a detecting function of the binarized data.

6. The signal processing device according to claim 5, wherein said nonlinear function is a sigmoid function.

7. A signal processing device of a disk read-out signal comprising a neural network type signal processing circuit which detects a binarized data from the digital signal including a waveform distortion component, and which comprises an input signal sampling layer in which an input signal waveform is sampled, at least two pattern recognition layers, constructed with pattern recognition nodes which multiply an amplitude value of said sampled input signal waveform by a weighting coefficient obtained by a learning process, and an output value judgment node which multiplies an output value from each pattern recognition node in said pattern recognition layers by the weighting coefficient obtained by the learning process, judges "0" data or "1" data based on this each multiplication result, detects binarized data from said second read-out signal, wherein said neural network type signal processing circuit includes a waveform equalizing function and a detecting function of the binarized data.

8. An optical disk drive comprising:

an optical pickup which reads a read-out signal from an optical disk;

an amplifier which amplifies an analog signal waveform or the read-out signal read from said optical pickup;

a filter which decreases a noise of the read-out signal output from said amplifier;

an A/D converter which converts the read-out signal of which noise is decreased by said filter into a digital signal including a waveform distortion component; and a neural network type signal processing circuit which detects a binarized data from the digital signal, said neural network type signal processing circuit comprising an input layer, at least two hidden layers and an output layer and including a waveform equalizing function and a detecting function of the binarized data.

9. The optical disk drive according to claim 8, wherein said input layer has a plurality of delay elements which have a delay time of a data clock cycle and are connected in series, each of said at least two hidden layers has a plurality of nodes without a connection relationship mutually, the output layer has one output node, each of signals on each end of the delay elements constructing said input layer is multiplied by a coupling weighting value and a result thereof is input to each node in a first hidden layer of said at least two hidden layers, each of said plurality of nodes in said at least two hidden layers outputs a value of a nonlinear function for a sum total of an input, and said output node inputs a value by which a coupling weighting value is multiplied to an output of each of said plurality of nodes in said at least two hidden layers, respectively, and outputs an output value of a nonlinear function for an input sum total of said output node.

10. The optical disk drive according to claim 9, wherein said nonlinear function is a sigmoid function.

11. The optical disk drive according to claim 8, wherein said input layer samples an input signal waveform, each of said hidden layers has a plurality of pattern recognition nodes to multiply an amplitude value of said sampled input signal waveform by a weighting coefficient obtained by a learning process, and said output layer has an output value judgment node to multiply an output value from each pattern recognition node in said at least two hidden layers by the weighting coefficient obtained by the learning process, judge "0" data or "1" data based on this each multiplication result, and output a result thereof.

\* \* \* \* \*